(12) United States Patent
Jo et al.

(10) Patent No.: US 12,397,688 B2
(45) Date of Patent: Aug. 26, 2025

(54) CONTINUOUS RECLINER OF VEHICLE SEATS

(71) Applicant: DAS CO., LTD, Gyeongju-si (KR)

(72) Inventors: Jae Geun Jo, Ulsan (KR); Chang Gi Lee, Ulsan (KR)

(73) Assignee: DAS CO., LTD., Gyeongju-si (KR)

( * ) Notice: Subject to any disclaimer, the term of this patent is extended or adjusted under 35 U.S.C. 154(b) by 329 days.

(21) Appl. No.: 18/153,603

(22) Filed: Jan. 12, 2023

(65) Prior Publication Data

US 2023/0271533 A1    Aug. 31, 2023

(30) Foreign Application Priority Data

Feb. 28, 2022    (KR) .................. 10-2022-0025728

(51) Int. Cl.
*B60N 2/225*    (2006.01)
*B60N 2/22*    (2006.01)

(52) U.S. Cl.
CPC ........... *B60N 2/225* (2013.01); *B60N 2/2213* (2013.01)

(58) Field of Classification Search
CPC ..... B60N 2/2213; B60N 2/2252; B60N 2/225
See application file for complete search history.

(56) References Cited

U.S. PATENT DOCUMENTS

| | | | | |
|---|---|---|---|---|
| 5,531,504 A | * | 7/1996 | Schmale | B60N 2/225 |
| | | | | 297/354.12 |
| 7,090,299 B2 | * | 8/2006 | Lange | B60N 2/2254 |
| | | | | 297/362 |
| 7,354,108 B2 | * | 4/2008 | Matsumoto | B60N 2/2252 |
| | | | | 475/180 |

FOREIGN PATENT DOCUMENTS

| | | |
|---|---|---|
| DE | 10021403 A1 | 11/2001 |
| EP | 1731353 A2 | 12/2006 |
| JP | 2013094375 A | 5/2013 |

* cited by examiner

*Primary Examiner* — Milton Nelson, Jr.
(74) *Attorney, Agent, or Firm* — Tarolli, Sundheim, Covell & Tummino LLP

(57) ABSTRACT

Provided is a continuous recliner for vehicle seats, in which an internal gear and a cover plate are fixed to each other, and the cover plate is welded to a cushion bracket. A heat transfer path is lengthened to prevent deterioration in the surface roughness of sliding friction parts, thereby reducing the operating force and operating noise of the recliner.

5 Claims, 7 Drawing Sheets

[FIG. 1]
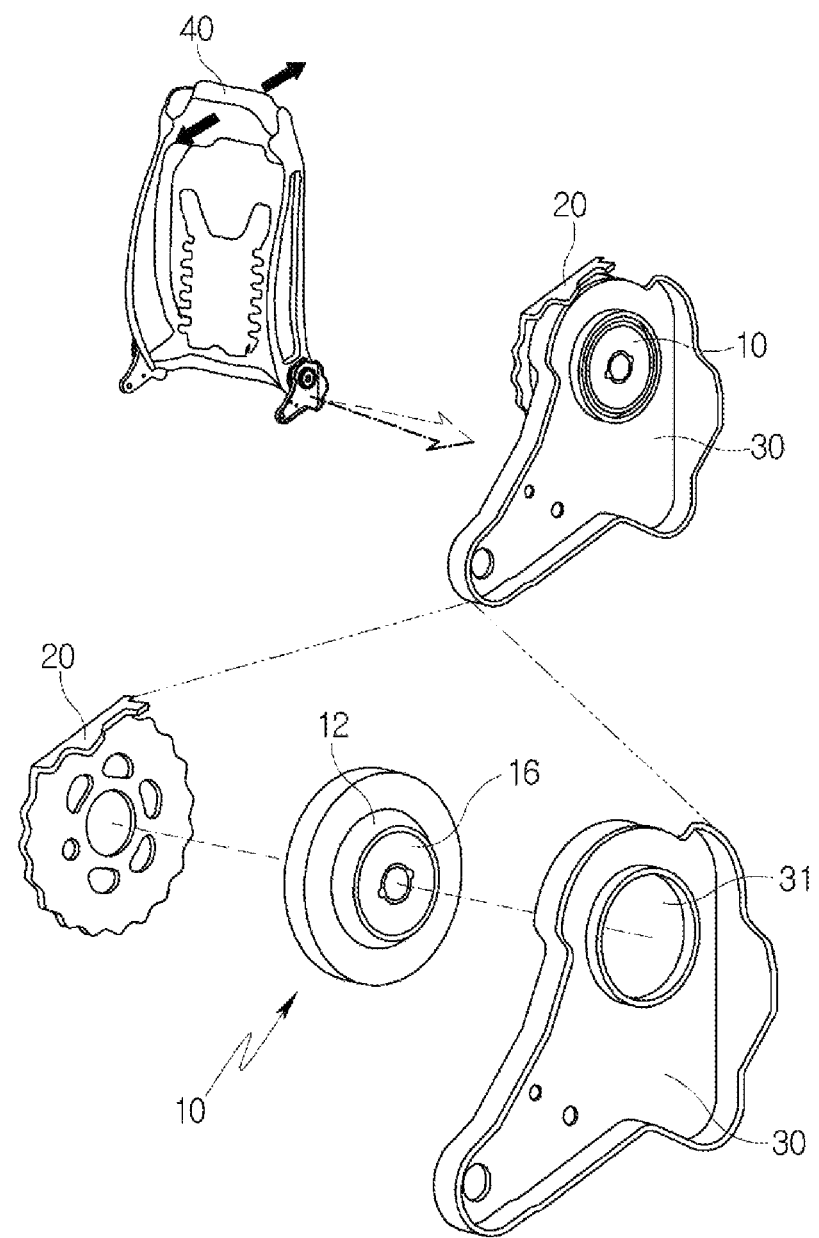

[FIG. 2]
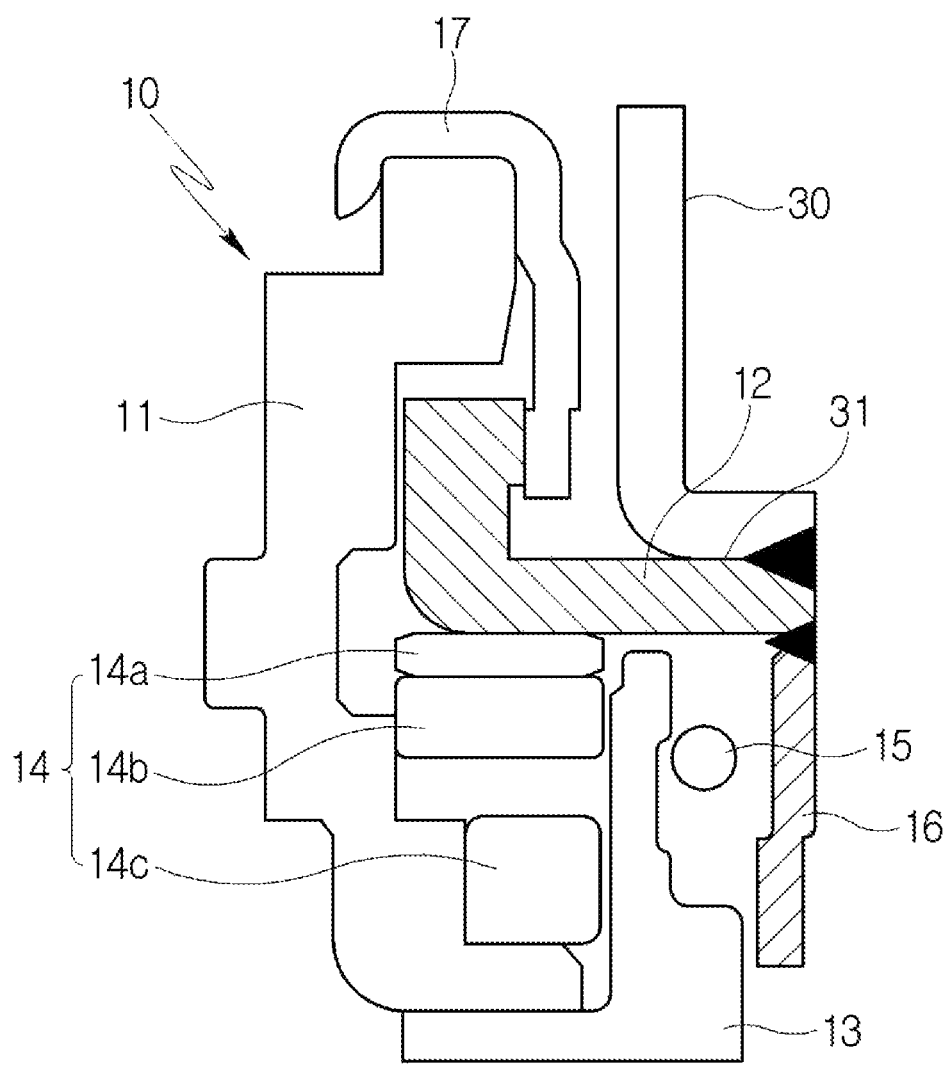

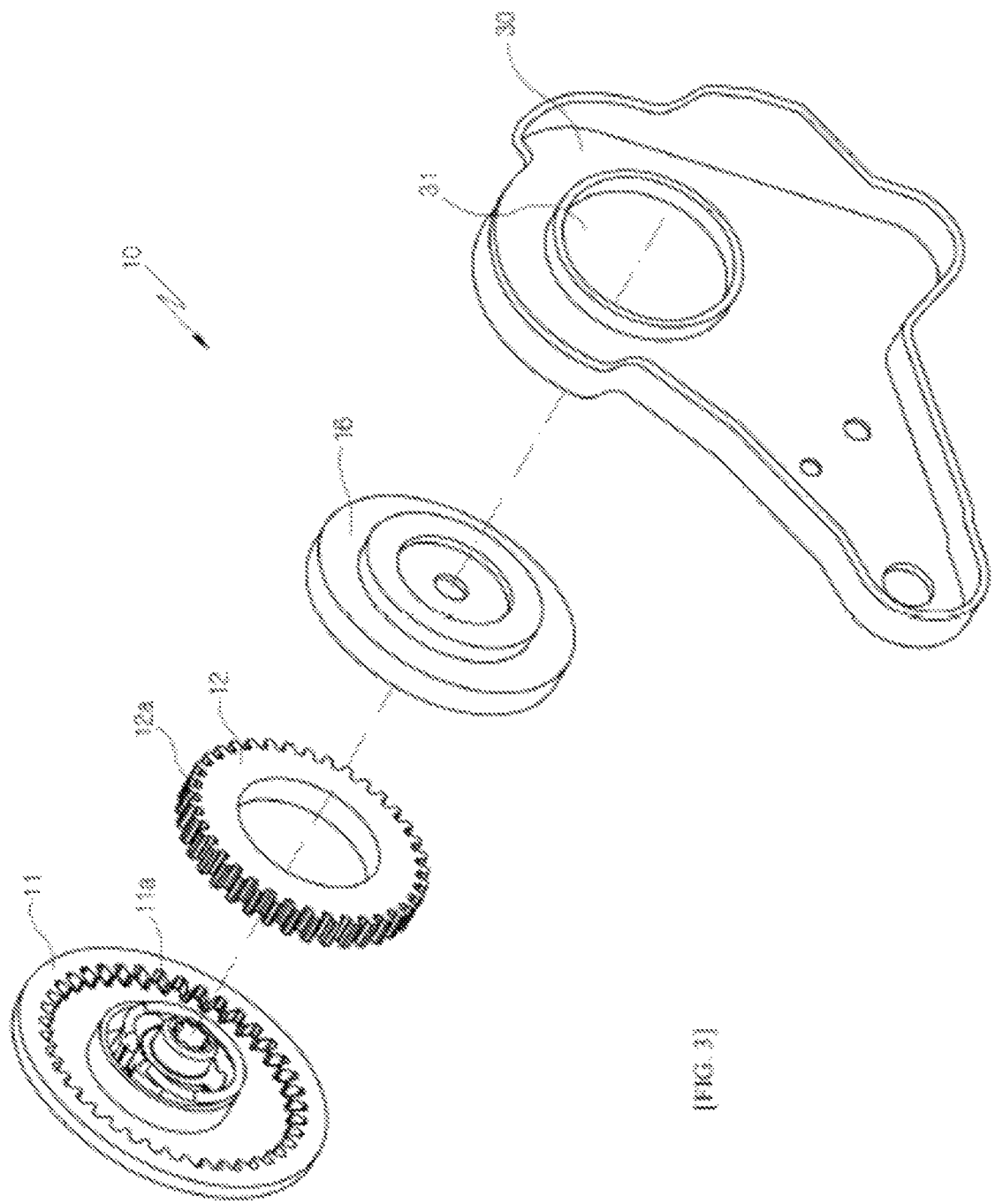

[FIG. 4]
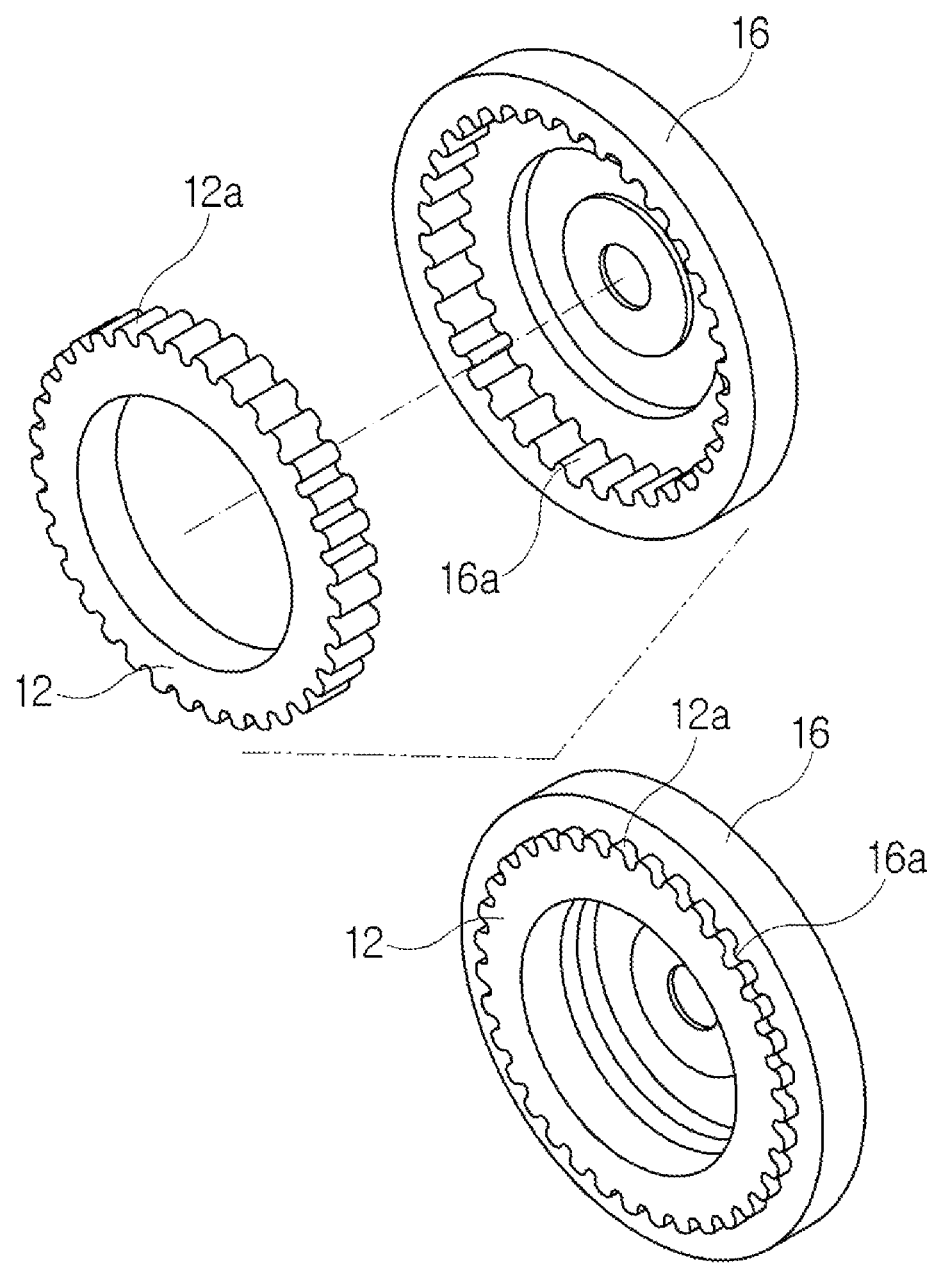

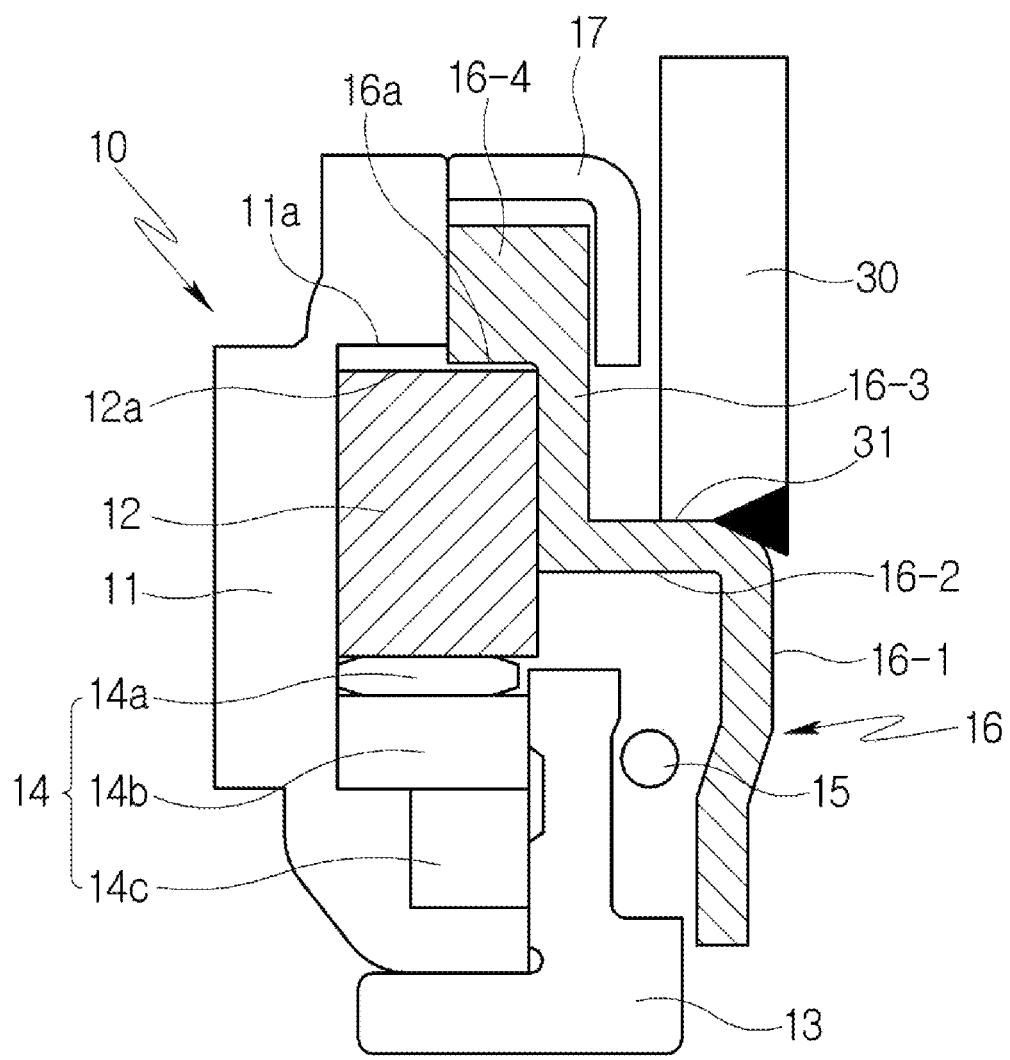
[FIG. 5]

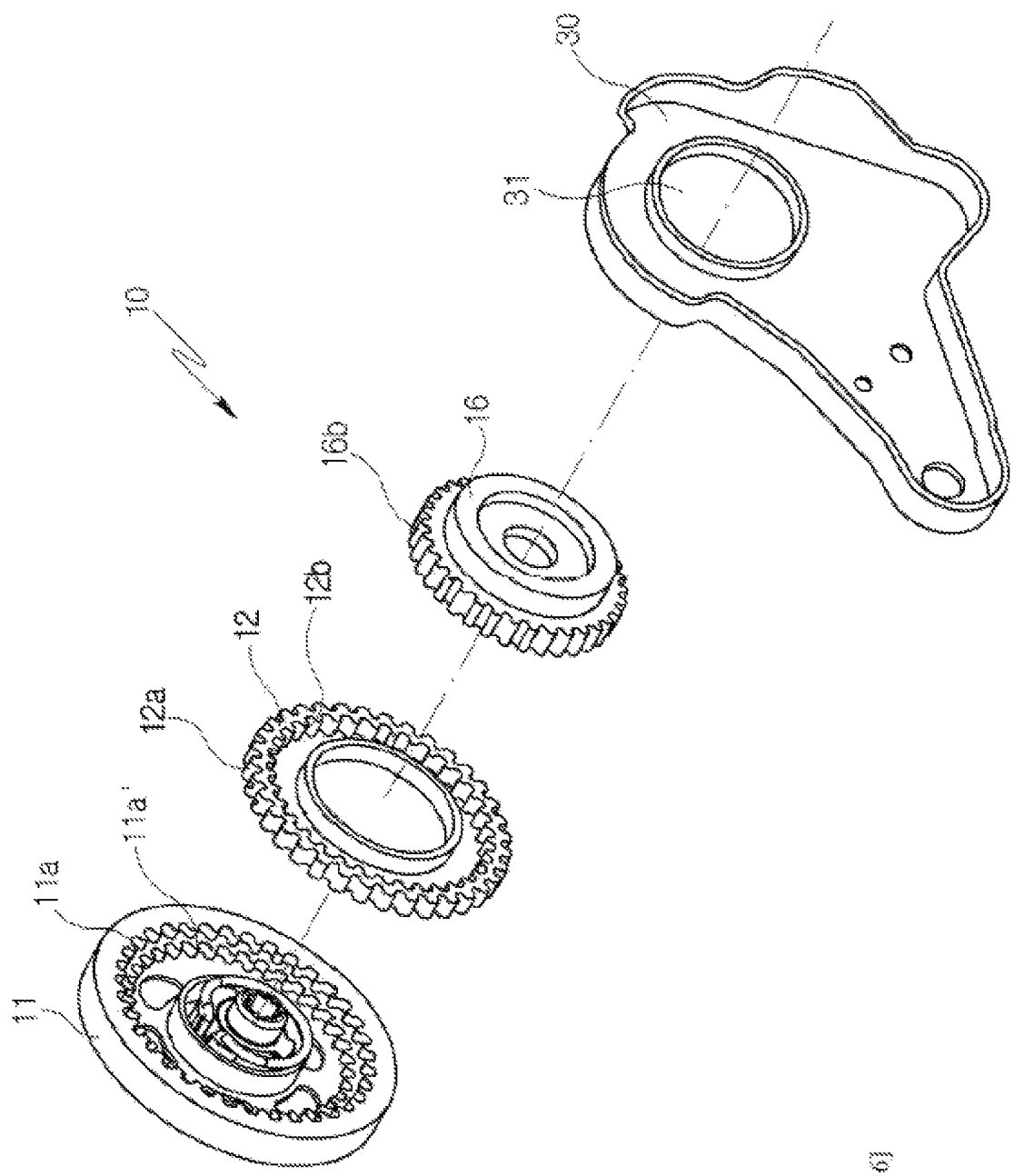
[FIG. 6]

[FIG. 7]
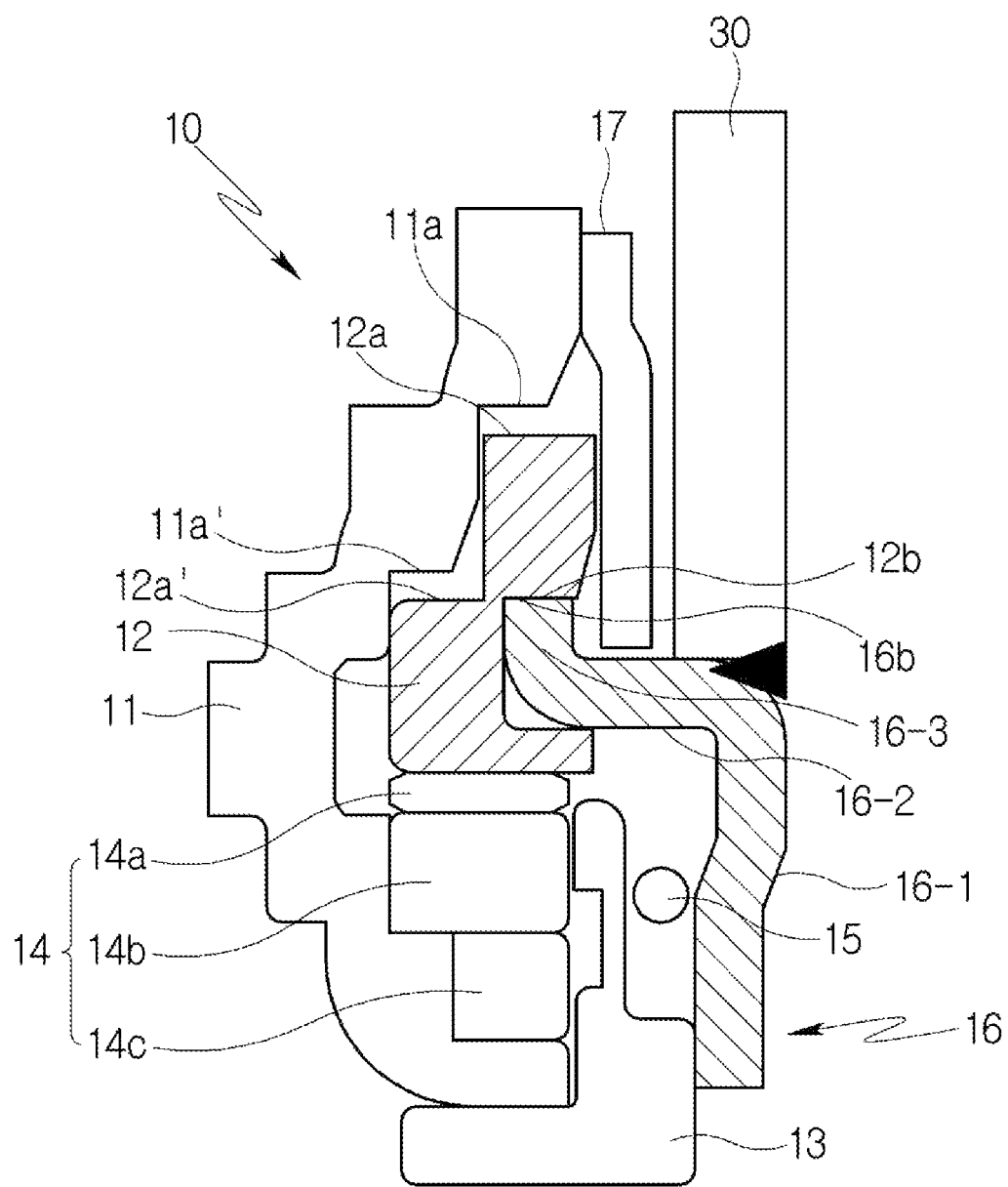

CONTINUOUS RECLINER OF VEHICLE SEATS

CROSS REFERENCE TO RELATED APPLICATION

The present application claims priority to Korea Patent Application No. 10-2022-0025728, filed Feb. 28, 2022, the entire contents of which is incorporated herein for all purposes by this reference.

FIELD

The present disclosure relates to a continuous recliner for vehicle seats, and relates to a continuous recliner for vehicle seats capable of transferring a rotational force, performing deceleration and maintaining an angle-adjusted state using an external gear and an internal gear.

BACKGROUND

A recliner is installed at a connection portion between a seatback and a seat cushion in a vehicle seat. The recliner is a device capable of enabling the angle of the seatback to be adjusted. In an unlocked state, the angle of the seatback is adjusted forward and backward, and in a locked state, the angle of the seatback, which has been adjusted to a desired position, is maintained.

As shown in FIG. 1, a recliner 10 is installed between a back bracket 20 mounted at the lower end of a side of a seatback frame 40 and a cushion bracket 30 mounted at the rear end of a side of a seat cushion frame (not shown).

FIG. 2 is a cross-sectional view of the recliner 10. An external gear 11 and an internal gear 12 are eccentrically inscribed, and a bush 14a is press-fitted into an inner diameter portion of the internal gear 12.

A socket 13 is rotatably inserted into an inner diameter portion of a center boss of the external gear 11, and a pair of wedges 14b and a cam sleeve 14c are installed between the bush 14a and an outer diameter portion of the center boss of the external gear 11. The bush 14a, the wedges 14b, and the cam sleeve 14c are generally referred to as sliding friction parts 14 because their contact surfaces slide to cause friction when the recliner is operated.

The boss of the internal gear 12 is inserted into and welded to the inner circumferential surface of an installation hole 31 of the cushion bracket 30.

A disc-like cover plate 16 is welded to the inner diameter portion of the boss of the internal gear 12 to prevent the socket 13, the sliding friction parts 14, and a wedge spring 15 from escaping to the outside of the recliner 10. A guide ring 17 installed on an outer periphery of the external gear 11 prevents separation between the external gear 11 and the internal gear 12.

The wedges 14b are pushed by the wedge spring 15 installed on the outside of the socket 13 to constraint rotation of the external gear 11 with respect to the internal gear 12 by a wedge action.

The rotation of the socket 13 causes the wedges 14b to rotate in the opposite direction to a locked position via the cam sleeve 14c to release a constrained state of the external gear 11 due to the wedge 14b and eccentrically rotate the external gear 11 with respect to the internal gear 12 by being interlocked with the rotation of the socket 13. Therefore, the rotation (self-rotation) of the external gear 11 according to a gear ratio between the internal gear 12 and the external gear 11 is caused, thereby adjusting the angle of the seatback connected to the side of the external gear 11.

On the other hand, in the conventional recliner 10 as described above, the boss (central cylindrical portion) of the internal gear 12 is necessarily elongated to protrude by 15 mm or more in order to weld the internal gear 12 to the cushion bracket 30. The boss is formed by burring processing. A process of forming the boss of 15 mm or more with burring processing is difficult and time-consuming. Therefore, many defects occur in which variability in protrusion length of the boss is large and the end shape is not perfect, and the production speed of the internal gear 12 is reduced.

In addition, since the internal gear 12 is welded to the cushion bracket 30 and the cover plate 16 is welded to the internal gear 12, excessive welding heat is transferred to the sliding friction parts 14 via the internal gear 12. Therefore, the sliding friction parts 14 are damaged by heat and the surface roughness is deteriorated to cause increased friction loss during operation of the recliner 10, resulting in an increase in operating force and operating noise of the recliner.

The use of laser welding to reduce the thermal effect as described above causes an increase in manufacturing cost, and nevertheless, welding defects often occur during laser welding due to variability in length of the boss of the internal gear 12 and defective end shape as described above.

SUMMARY

Therefore, the present disclosure has been made to solve the above problems, and an object of the present disclosure is to provide a continuous recliner for vehicle seats, in which thermal damage to sliding friction parts is reduced to reduce an operating force and an operating noise, there is no need to form a long boss for an internal gear to improve the production speed of the internal gear as well as reduce defects, a wide choice of welding types is provided and welding defects are reduced.

According to an aspect, a continuous recliner for vehicle seats includes an external gear fixed to a back bracket of a seatback frame, an internal gear eccentrically inscribed in the external gear, and a cover plate press-fitted into and coupled to the internal gear and fixed to a cushion bracket of a seat cushion frame.

The cover plate may include a disc portion forming one side surface of the recliner, a cylindrical portion extending from an end of the disc portion in a direction of a central axis of the recliner, and a flange portion outwardly extending from an end of the cylindrical portion in a radial direction of the recliner.

The cylindrical portion of the cover plate may be inserted into and welded to an installation hole formed in the cushion bracket.

The flange portion of the cover plate may be formed larger than an outer diameter of the internal gear, the flange portion including a rim portion having an extended thickness at an end of the flange portion, and the internal gear may be press-fitted into an inner diameter surface of the rim portion.

The inner diameter surface of the rim portion of the cover plate may be formed with gear teeth to mesh with gear teeth formed in an outer diameter portion of the internal gear.

The flange portion of the cover plate may be formed with gear teeth at an end thereof to mesh with gear teeth formed in an inner diameter portion of the internal gear.

A guide ring may be mounted on the external gear, and an end of the guide ring on an inner diameter side thereof may be formed to have a length extending beyond a boundary between the internal gear and the cover plate to cover a side of the flange portion of the cover plate.

BRIEF DESCRIPTION OF THE DRAWINGS

FIG. 1 is a view showing a general recliner installation structure.

FIG. 2 is a cross-sectional view showing a coupling structure between a recliner and a cushion bracket according to the prior art.

FIG. 3 is an exploded perspective view of a recliner according to a first embodiment of the present disclosure.

FIG. 4 is a rear view of an internal gear and a cover plate in FIG. 3 and a view showing a coupling state between the internal gear and the cover plate.

FIG. 5 is a cross-sectional view showing a coupling structure between the recliner and the cushion bracket according to the first embodiment.

FIG. 6 is an exploded perspective view of a recliner according to a second embodiment of the present disclosure.

FIG. 7 is a cross-sectional view showing a coupling structure between the recliner and the cushion bracket according to the second embodiment.

DETAILED DESCRIPTION

The present disclosure may be variously modified and may have various embodiments, and particular embodiments illustrated in the drawings will be described in detail below. However, the description of the exemplary embodiments is not intended to limit the present disclosure to the particular exemplary embodiments, but it should be understood that the present disclosure is to cover all modifications, equivalents and alternatives falling within the spirit and technical scope of the present disclosure. Thicknesses of lines illustrated in the accompanying drawings, sizes of constituent elements, or the like may be exaggerated for clarity and convenience of description.

In addition, the terms used below are defined in consideration of the functions in the present disclosure and may vary depending on the intention of a user or an operator or precedents. Therefore, the definition of the terms should be made based on the entire contents of the present specification.

Hereinafter, preferred embodiments according to the present disclosure will be described in detail with reference to the accompanying drawings. Since the basic configuration of a continuous recliner for vehicle seats according to the present disclosure is the same as that of the prior art, a description will be given while the same reference numerals are denoting components. Also, in the drawings, a triangle indicates a welded portion.

That is, a recliner 10 according to the present disclosure may include an external gear 11 and an internal gear 12 which are eccentrically inscribed, sliding friction parts 14 (a bush 14a, a wedge 14b, and a cam sleeve 14c) installed between the external gear 11 and the internal gear 12 to engage or release the external gear 11 to or from the internal gear 12, and a socket 13 rotatably installed on a center boss of the external gear 11 to operate the wedge 14b.

In addition, the recliner 10 according to the present disclosure may further include a wedge spring 15 installed on an outer portion of the socket 13 to continuously apply a force in a direction constraining the wedge 14b, a cover plate 16 configured to block the central portion of one side of the recliner to prevent escapes of internal parts (the socket 13, the sliding friction parts 14, and the wedge spring 15), and the guide ring 17 configured to prevent the separation between the external gear 11 and the internal gear 12.

The recliner 10 according to the present disclosure is characterized by its coupling structure with the cushion bracket 30. That is, the recliner 10 according to the present disclosure is characterized in that the recliner 10 is mounted to the cushion bracket 30 in such a way that the cover plate 16 is welded to the cushion bracket 30.

In addition, as the cover plate 16 is coupled to the internal gear 12 by press fitting, the internal gear 12 is mounted on the side of the cushion bracket 30 via the cover plate 16 to cause the internal gear 12 to be fixed in a non-rotatable state.

Two embodiments including all of the above features will be described in detail below.

FIGS. 3 to 5 are views showing a first embodiment.

A cover plate 16 according to the first embodiment may include a disc portion 16-1 disposed on the outer side of a socket 13 in an assembled state of a recliner 10, a cylindrical portion 16-2 bent and extended from an end of the disc portion 16-1 in a direction parallel to the direction of the central axis of the recliner 10, a flange portion 16-3 outwardly extended from an end of the cylindrical portion 16-2 in the radial direction of the recliner 10, and a rim portion 16-4 having an extended thickness at an end of the flange portion 16-3.

The flange portion 16-3 may be formed larger in the radial direction than the internal gear 12 in the assembled state of the recliner, and the rim portion 16-4 may be formed around the entire periphery of the plate 16, that is, the entire periphery of the cover plate 16.

The rim portion 16-4 may be formed to be thicker than the flange portion 16-3, and the internal gear 12 is press-fitted to the inner circumferential surface of the rim portion 16-4, so that the internal gear 12 and the cover plate 16 are fixed to each other. That is, the internal gear 12 and the cover plate 16 are fixed by press-fitting so as for the internal gear 12 and the cover plate 16 not to move in the axial and circumferential directions. In this case, in order to more reliably prevent rotational movement between the internal gear 12 and the cover plate 16, gear teeth 16a corresponding to gear teeth 12a formed in the outer circumferential surface of the internal gear 12 may be formed in the inner circumferential surface of the rim portion 16-4. In this case, the gear teeth 12a of the internal gear 12 and the gear teeth 16a in the cover plate 16 are engaged with each other to certainly prevent relative movement (rotation) between the internal gear 12 and the cover plate 16 in the circumferential direction. That is, the internal gear 12 is fixed to the cover plate 16 to be unable to rotate.

The cover plate 16 may be mounted to the cushion bracket 30 in such a way that one side of the cylindrical portion 16-2 is welded to the inner circumferential surface of the installation hole 31 of the cushion bracket 30. Since the cushion bracket 30 is mounted to the cushion frame and fixed in position, both the cover plate 16 welded to the cushion bracket 30 and the internal gear 12 press-fitted into the cover plate 16 are fixed, and the external gear 11 rotates eccentrically around the external circumference of the internal gear 12.

When the internal gear 12 is approximately divided to two portions with respect to the thickness thereof, the gear teeth 16a of the cover plate 16 mesh with one half portion of the internal gear 12, and the gear teeth 11a of the external gear 11 mesh with the other half portion of the internal gear 12.

In the assembled state of the recliner, the disc portion 16-1 of the cover plate 16 may block one side of the recliner 10 to prevent the inner socket 13, the sliding friction parts 14, the wedge spring 15 or the like from escaping to the outside.

The cylindrical portion 16-2 may provide a welding surface to which the cushion bracket 30 is able to be welded, and form a stepped portion between the disc portion 16-1 and the flange portion 16-3.

The flange portion 16-3 may expand the radius of the cover plate 16 more than the radius of the internal gear 12, and provide a support surface when the internal gear 12 is press-fitted into the rim portion 16-4.

The rim portion 16-4 may provide a press-fitting surface into which the outer diameter portion of the internal gear 12 is press-fitted, and may be formed with the gear teeth 16a which mesh with the gear teeth 12a of the internal gear 12 to reliably suppress rotation of the internal gear 12 with respect to the cover plate 16. In addition, the guide ring 17 welded to an end of the outer diameter portion of the external gear 11 is installed in a structure surrounding the rim portion 16-4 to prevent the external gear 11 and the internal gear 12 from being separated from each other.

In the recliner according to the first embodiment, the cover plate 16 fixedly coupled to the internal gear 12 is welded to the cushion bracket 30 instead of the internal gear 12, thus removing a necessity to perform a burring processing for generating a long boss on the internal gear 12. Therefore, the occurrence of processing defects such as variability in length of the boss or defective end shape is fundamentally prevented, and the manufacturing of the internal gear 12 is easy to improve production speed.

In addition, since welding heat occurring at a welding portion between the cover plate 16 and the cushion bracket 30 is transferred to the sliding friction parts 14 via the cover plate 16 and the internal gear 12, a heat transfer path is increased compared to the prior art, and thus the amount of heat transferred to the sliding friction parts 14 is reduced. Therefore, since the deterioration in surface roughness due to thermal damage to the sliding friction parts 14 does not occur, friction is reduced when the recliner is operated, thus reducing not only the operating force of the recliner but also the operating noise of the recliner.

As described above, since the safety of internal parts against welding heat is improved, not only laser welding but also other types of welding, such as MAG (Metal Active Gas) welding, may be performed. Therefore, welding cost is reduced and laser welding that requires high precision for an object to be welded is not required, thereby preventing welding defects due to variability in length of the boss of the internal gear 12 and the defective shape.

FIGS. 6 and 7 show a second embodiment of the present disclosure. In the second embodiment, the present disclosure is applied when the external gear 11 and the internal gear 12 are coupled in a double-stepped structure.

In order to improve the coupling stability of the external gear 11 and the internal gear 12 and reduce the load applied to the gear teeth, the external gear 11 and the internal gear 12 of the recliner may have a multi-stepped coupling structure, and a double-stepped coupling structure is usually applied as shown in FIGS. 6 and 7.

For the double-stepped coupling structure, two rows of gear teeth 11a and 11a' are continuously formed in the inner circumferential surface of the external gear 11 while a stepped portion is provided therebetween. Correspondingly, two rows of gear teeth 12a and 12a' are continuously formed in the outer circumferential surface of the internal gear 12 while a stepped portion is provided therebetween. Generally, since second-stepped gear teeth 12a' (inner gear teeth in radial direction) of the internal gear 12 are formed by press processing, the inner circumferential surface of a stepped portion in which first-stepped gear teeth 12a (outer gear teeth in radial direction) are formed, are formed with gear teeth 12b having the same shape as the second-stepped gear teeth 12a'.

The gear teeth 16b formed in the outer circumferential surface of the flange portion 16-3 of the cover plate 16 are press-fitted into the gear teeth 12b, so that the internal gear 12 and the cover plate 16 are mutually fixed in the axial and circumferential directions.

The disc portion 16-1 and the cylindrical portion 16-2 of the cover plate 16 according to the second embodiment are the same as those of the first embodiment, and the flange portion 16-3 is formed shorter than that of the first embodiment in accordance with the formation position of the gear teeth 12b on an inner diameter side of the internal gear 12. The gear teeth 16b press-fitted between the teeth 12b of the internal gear 12 are formed at an end of the flange portion 16-3.

Even in the case of this second embodiment, the internal gear 12 and the cover plate 16 are fixed to each other in the axial and circumferential directions by press-fitting and tooth engagement, and the cylindrical portion 16-2 of the cover plate 16, not the internal gear 12, is inserted into and welded to the installation hole 31 of the cushion bracket 30, thus achieving the same effect as that of the first embodiment.

That is, since a boss is not formed in the internal gear 12, reduction of defects and improvement of production speed are achieved during the production of the internal gear 12, and damage to internal parts due to welding heat is prevented, thereby resulting in same effects as the first embodiment, such as reduction in the operating force and operating noise of the recliner. Since the mechanism (operating principle or structure) for effect generation is the same as that of the first embodiment, redundant description will be omitted.

On the other hand, in the second embodiment, an inner end of the guide ring 17 in the radial direction is molded to extend to the side of the flange portion 16-3 of the cover plate 16 beyond the boundary between the internal gear 12 and the cover plate 16. Therefore, the guide ring 17 is caught on the flange portion 16-3, thus preventing the internal gear 12 and the cover plate 16 from being separated from the external gear 11 in the axial direction.

According to the present disclosure as described above, it is possible to provide a continuous recliner having a structure in which the cover plate coupled to the internal gear is welded to the cushion bracket.

Therefore, it is possible to remove a necessity to form a boss for welding to the cushion bracket in the internal gear and facilitate processing of the center hole of the internal gear to improve the production speed of the internal gear and reduce shape defects.

In addition, since welding heat is first transferred to the cover plate and then to the internal gear and transferred to the sliding friction parts from the internal gear, the amount of welding heat transferred to the sliding friction parts is reduced. Therefore, the degradation in surface roughness due to thermal damage to the sliding friction parts does not occur, and thus, the frictional force is reduced during operation of the sliding friction parts, thereby reducing the operating force and operating noise of the recliner.

Since the safety of the sliding friction parts against the welding heat is improved as described above, there is no need to use laser welding alone when the recliner is welded to the cushion bracket. That is, not only laser welding but also other types of welding may be performed.

In addition, since problems such as variability in the length of the boss or shape defects do not occur in the internal gear, frequent welding defects does not occur.

Although some embodiments have been provided to illustrate the invention in conjunction with the drawings, it will be apparent to those skilled in the art that the embodiments are given by way of illustration only, and that various modifications and equivalent embodiments can be made without departing from the spirit and scope of the invention. Accordingly, the scope and spirit of the present disclosure should be limited only by the following claims.

| REFERENCE NUMERALS | |
|---|---|
| 10: Recliner | 11: External gear |
| 11a and 11a': Gear teeth | 12: Internal gear |
| 12a, 12a', 12b: Gear teeth | 13: Socket |
| 14: Sliding friction part | 14a: Bush |
| 14b: Wedge | 14c: Cam sleeve |
| 15: Wedge spring | 16: Cover plate |
| 16a and 16b: Gear teeth | 16-1: Disc portion |
| 16-2: Cylindrical portion | 16-3: Flange portion |
| 16-4: Rim portion | 17: Guide ring |
| 20: Back bracket | 30: Cushion bracket |
| 31: Installation hole | 40: Seatback frame |

What is claimed is:

1. A continuous recliner for vehicle seats comprising:
an external gear fixed to a back bracket of a seatback frame;
an internal gear eccentrically inscribed in the external gear; and
a cover plate press-fitted into and coupled to the internal gear and fixed to a cushion bracket of a seat cushion frame, the cover plate comprising:
a disc portion forming one side surface of the recliner;
a cylindrical portion extending from an end of the disc portion in a direction of a central axis of the recliner, the cylindrical portion of the cover plate being inserted into and welded to an installation hole formed in the cushion bracket; and
a flange portion outwardly extending from an end of the cylindrical portion in a radial direction of the recliner.

2. The continuous recliner of claim 1, wherein the flange portion of the cover plate is formed with gear teeth at an end thereof to mesh with gear teeth formed in an inner diameter portion of the internal gear.

3. The continuous recliner of claim 2, wherein a guide ring is mounted on the external gear, and an end of the guide ring on an inner diameter side thereof is formed to have a length extending beyond a boundary between the internal gear and the cover plate to cover a side of the flange portion of the cover plate.

4. The continuous recliner of claim 1, wherein the flange portion of the cover plate is formed larger than an outer diameter of the internal gear, the flange portion comprising a rim portion having an extended thickness at an end of the flange portion, and wherein the internal gear is press-fitted into an inner diameter surface of the rim portion.

5. The continuous recliner of claim 4, wherein the inner diameter surface of the rim portion of the cover plate is formed with gear teeth to mesh with gear teeth formed in an outer diameter portion of the internal gear.

* * * * *